US00RE33902E

United States Patent [19]

Fritchman

[11] E Patent Number: Re. 33,902

[45] Reissued Date of Patent: Apr. 28, 1992

[54] COMPRESSOR HEAD AND SUCTION MUFFLER FOR HERMETIC COMPRESSOR

[75] Inventor: Jack F. Fritchman, Cullman, Ala.

[73] Assignee: White Consolidated Industries, Inc., Cleveland, Ohio

[21] Appl. No.: 584,042

[22] Filed: Sep. 18, 1990

Related U.S. Patent Documents

Reissue of:

[64] Patent No.: 4,784,581
Issued: Nov. 15, 1988
Appl. No.: 2,575
Filed: Jan. 12, 1987

[51] Int. Cl.[5] ..... F04B 11/00; F04B 39/12

[52] U.S. Cl. ..... 417/312; 417/541; 417/902; 62/296; 181/403

[58] Field of Search ..... 419/312, 313, 540–543, 419/571, 902; 62/296; 181/403

[56] References Cited

U.S. PATENT DOCUMENTS

| | | | |
|---|---|---|---|
| 3,713,513 | 1/1973 | Harris et al. | 417/902 |
| 3,817,661 | 6/1974 | Ingalls et al. | 417/312 |
| 4,370,104 | 1/1983 | Nelson et al. | 417/312 |
| 4,401,418 | 8/1983 | Fritchman | 417/312 |
| 4,415,060 | 11/1983 | Bar | 417/312 |
| 4,477,229 | 10/1984 | Kropinwicki et al. | 417/312 |
| 4,573,880 | 3/1986 | Hirano et al. | 417/312 |
| 4,573,881 | 3/1986 | Romer | 417/312 |

FOREIGN PATENT DOCUMENTS

| | | | |
|---|---|---|---|
| 0195486 | 9/1986 | European Pat. Off. | 417/312 |
| 53-103209 | 9/1978 | Japan | 417/571 |
| 56-014878 | 2/1981 | Japan | 417/571 |
| 56-060883 | 5/1981 | Japan | 417/571 |

*Primary Examiner*—Richard A. Bertsch
*Assistant Examiner*—David L. Cavanaugh
*Attorney, Agent, or Firm*—Nies, Kurz, Bergert & Tamburro

[57] ABSTRACT

A hermetic reciprocating piston refrigeration compressor utilizes separate cylinder head members for the discharge and suction plenum chambers adjacent the discharge and suction valves. The two cylinders heads extend over substantially the entire area of the valve plate at the end of the cylinder carrying the valves. A discharge cylinder head is formed of metal while the suction cylinder head is formed of a plastic material of low thermal conductivity to minimize heat transfer between the discharge and suction plenums. The suction cylinder head is formed as a unitary member to include also passages and a portion of the suction muffler and is secured in place by a single fastening member.

16 Claims, 3 Drawing Sheets

COMPRESSOR HEAD AND SUCTION MUFFLER FOR HERMETIC COMPRESSOR

Matter enclosed in heavy brackets [ ] appears in the original patent but forms no part of this reissue specification; matter printed in italics indicates the additions made by reissue.

BACKGROUND OF THE INVENTION

This invention relates generally to hermetic refrigeration compressors of the type used in household appliances, and more particularly, to a suction muffler and cylinder head arrangements for single reciprocating piston compressors.

Refrigeration compressors used for household appliances such as refrigerators and freezers are generally of low horsepower, usually less than one third horsepower at the most and ranging down to as little as one sixth horsepower. Such compressors, when of the single piston type, use a relatively small displacement cylinder running at a relatively high speed powered by a two-pole electric motor which results in a maximum speed of 3,450 rpm using a 60 hertz power supply. Such compressors are generally run on a high-duty cycle which may range from 50 to 90%, depending upon the load inside the appliance and the ambient temperature. The application of such compressors requires that they have an extremely long life and must operate at a very low noise level and a very high efficiency for purposes of energy conservation.

Because of the relatively small displacement of such compressors, their valve arrangement is usually a valve plate mounted on the end of the cylinder utilizing a single-valve port for the suction side and single discharge port. Thus, the suction port operates with a reed valve formed out of a sheet of spring material on the underside of the valve plate and the discharge port is sealed off by a reed discharge valve mounted on the outer side of the valve plate. The valve plate is then covered by a cylinder head having suction and discharge plenum chambers formed therein with a conduit leading from the discharge plenum chamber to an external muffler, likewise, the suction plenum has a conduit leading from a suction muffler remote from the cylinder head and generally positioned to receive the incoming or return refrigerant gas in such a manner as to permit a minimum heating of the return gas by the environment within the compressor shell.

The cylinder head must be designed with the discharge plenum large enough to contain the discharge valve assembly and allow flow of the compressed refrigerant with a minimum of restriction. Because the compressed gas now has a high temperature, it tends to heat the surrounding environment and cylinder head. Because of the pressures within the discharge plenum, it is generally necessary to make the cylinder head from a metal casting using such materials as cast iron, or aluminum which tend to readily conduct the heat from the discharge plenum throughout the full extent of the cylinder head so that the entire cylinder head tends to be raised to the temperature of the discharged gases. Generally, the two plenum chambers in the cylinder head are divided by a wall which is preferably made as thin as possible to allow a maximum plenum volume in the small amount of space available.

On the other hand, the suction plenum should be as cool as possible to prevent heating of the suction gases which would lower the efficiency of the compressor. Furthermore, the suction plenum should be as large as possible so as to allow a minimum of pressure drop on the suction stroke of the compressor by providing the maximum volume of refrigerant gas available adjacent the suction port and the valve plate.

It has been recognized that increased energy efficiency can be obtained by making a suction muffler from a plastic material and mounting it as close to the suction plenum as possible. One such arrangement is shown in the present inventor's U.S. Pat. No. 4,401,418 assigned to the assignee of the present application. However, with the arrangement shown in that patent, it is still necessary to use a one piece cylinder head having the discharge and suction plenums formed integrally therein and separated by an internal wall. With this arrangement, the walls of the suction chamber, because of the high conductivity of the metal cylinder head, tend to allow a certain amount of heating of the suction gases within the plenum chamber.

One effort to overcome this seating is shown in U.S. Pat. No. 4,573,881 in which a tube formed of plastic material having a low thermal is mounted as a liner within the suction plenum and connects directly from the suction muffler chamber to the suction port in the valve plate. However, such an arrangement loses the advantage of the plenum chamber and may present difficulties on assembly of the compressor.

Another arrangement to reduce the heating of the suction gases is shown in U.S. Pat. No. 4,573,880. In this patent, a suction plenum is eliminated completely and a tube extends directly from the suction muffler into the suction port on the valve plate thereby completely eliminating the suction plenum. Thus, while heating of the suction gases is reduced, efficiency is also lost by the restrictions on flow at the suction port because of the lack of an immediately adjacent plenum chamber.

SUMMARY OF THE INVENTION

The present invention provides an improved cylinder head construction in which the cylinder head is made in two separate pieces. One of these pieces comprises the discharge plenum and can be made in the form of a metal casting held in place with a plurality of bolts to give adequate strength for the high pressures and temperatures encountered in this area. The other part of the cylinder head comprises the inlet plenum chamber and extends over a lesser area of the valve plate than the discharge plenum portion. The suction plenum is made of an insulating plastic material offering excellent strength in view of the lower temperatures and pressures in this area. The plenum may be made integral with the suction muffler assembly to provide a unitary assembly which may be quickly and easily mounted in place during the assembly of the compressor.

The suction muffler itself is preferably in many ways, similar to that shown in the present inventor's U.S. Pat. No. 4,401,418 particularly as to the gas flow paths and sound-reducing properties. In that patent, the suction muffler was mounted on a pair of metal tubes secured to a one-piece two chamber cylinder head and extended into the suction plenum. The suction muffler was formed from top and bottom members formed from a suitable plastic material with a bottom member being mounted in place over the two suction tubes. According to the present invention, the top member of the suction muffler may be substantially shown in said U.S.

Pat. No. 4,401,418 and the structural equivalent of the muffler bottom member, together with the two tubes and the portion of the cylinder head surrounding the suction plenum are preferably formed as a single bolted piece of plastic to which the top member of the suction member is attached. The entire assembly is held in place by means of a single bolt together with a metal bracket member which serves not only to distribute the clamping force as the bolt over a large area of the plastic material, but also as a support for holding an oil lubricating tube which is arranged to provide a small oil flow from the sump in the bottom of the compressor up to the section port in the valve plate. The suction muffler assembly is also retained in place by its engagement with intersecting surfaces on the discharge cylinder head.

With this arrangement, the suction muffler and suction plenum are essentially formed from two pieces of molded plastic material which enclose the cool suction gases over the entire flow path from the entry to the muffler chamber to the suction port on the valve plate itself. Thus, the incoming section gases have no contact with any surface made of a material of high thermal conductivity until they contact the valve plate itself, and since the flow path is directly from the suction plenum, through the valve plate port, and into the pumping cylinder, there is a minimum heating contact with the suction gases so that they may enter the pumping chamber at a lower temperature and higher density. By retaining a suction plenum, there is a minimum of restriction to fluid flow to prevent any throttling effect resulting from the flow of the suction gases through narrow passages necessary for the noise attenuation properties required for the suction muffler to reduce the overall noise level of the compressor.

DETAILED DESCRIPTION OF THE PREFERRED EMBODIMENT

Figure 1:
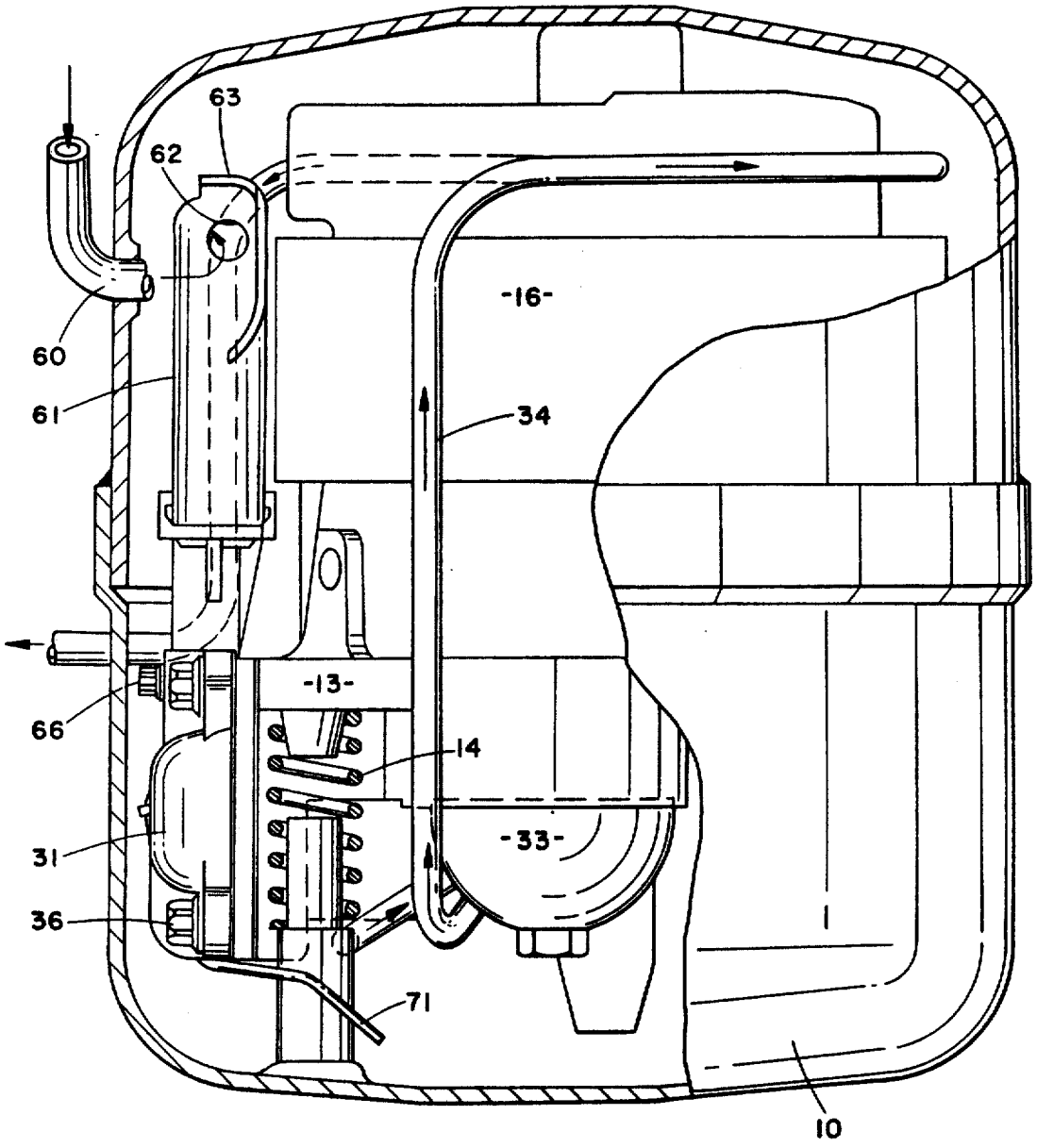
FIG. 1 is a side elevational view, partly in section, of a hermatic refrigeration compressor incorporating the present invention.
Figure 2:
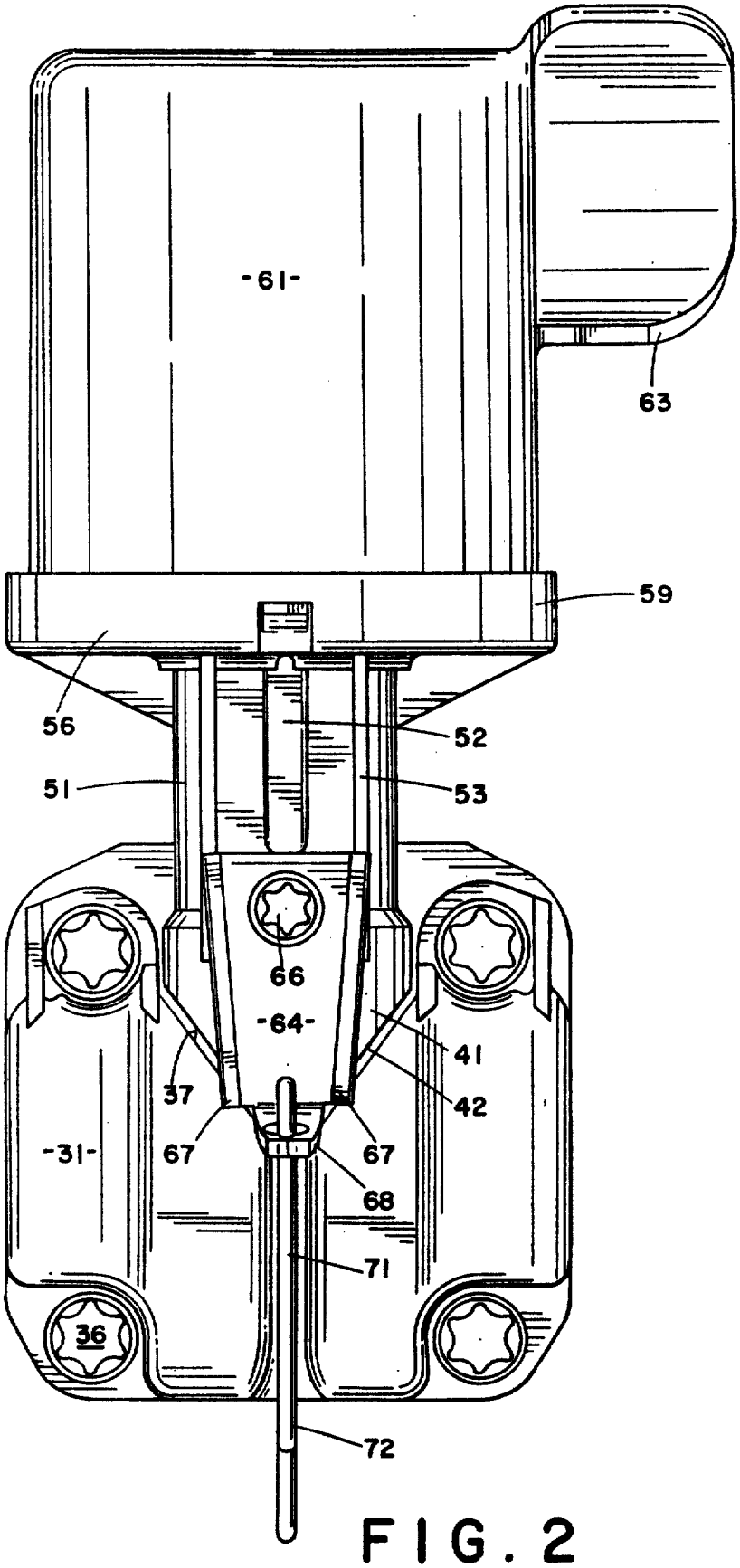
FIG. 2 is a front elevational view of the section muffler and cylinder head arrangement of the compressor shown in FIG. 1.

Referring now to the drawings in greater detail, as shown in FIG. 1, the hermetic refrigeration compressor includes an outer shell or casing 10 which is completely sealed and pressure-tight except for inlet and outlet tubes. Within the shell 10 is a cylinder block 13 which is resiliently mounted on springs 14 to minimize the transmission of vibration from the compressor to the shell. Mounted on the cylinder block 13 is an electric motor 16 which is operable by a suitable mechanism such as a crank and connecting rod (not shown) to reciprocate a piston 18 in a cylinder 17 (see also FIG. 3) to and from an end face 19.

The cylinder block end face 19 serves as a mounting point for the valve mechanism and cylinder heads which provide for the flow of cool incoming suction gases to the cylinder 17 and a discharge of high-pressure, high-temperature discharge gases. This structure includes a first gasket 21 mounted directly on the end face 19 above which is mounted a suction valve sheet 22. This sheet extends over the entire end face 19 and is formed from a thin sheet of spring steel of uniform thickness in which is formed the suction valve reed 25 via a cutting or etching process. The valve plate 23 is mounted above the valve sheet 22 and is generally coextensive therewith. The valve plate 23 is formed from a suitable hard, rigid material such as cast or sintered iron, of sufficient thickness to give enough rigidity to the valve plate to avoid any measurable deflection. The valve plate 23 includes at one area a suction port 24 against the underside of which is located a sealing portion or valve seat engagable by the suction valve reed 25. The suction valve reed 25 operates to open the suction port 24 when the piston is moving away from the valve plate and to automatically close on reversal of the piston when it begins its compression or discharge stroke.

Also located on the valve plate 23 is a discharge port 27, a spaced distance away from the suction port 24 and having on its outer surface a valve seat where the flow is controlled by a discharge valve assembly 28. The discharge valve 28 operates to seal the discharge port 27 during the suction stroke and to open when the piston reverses its direction on the discharge or compression stroke to allow the compressed gases to be discharged from the cylinder. Also located on the outer side of the valve plate 23 is a suitable gasket 29 which is generally coextensive with the outer periphery of the valve plate and extends across those portions of the valve plate which are not occupied by the discharge valve assembly 28 or the suction port 24.

Figure 4:
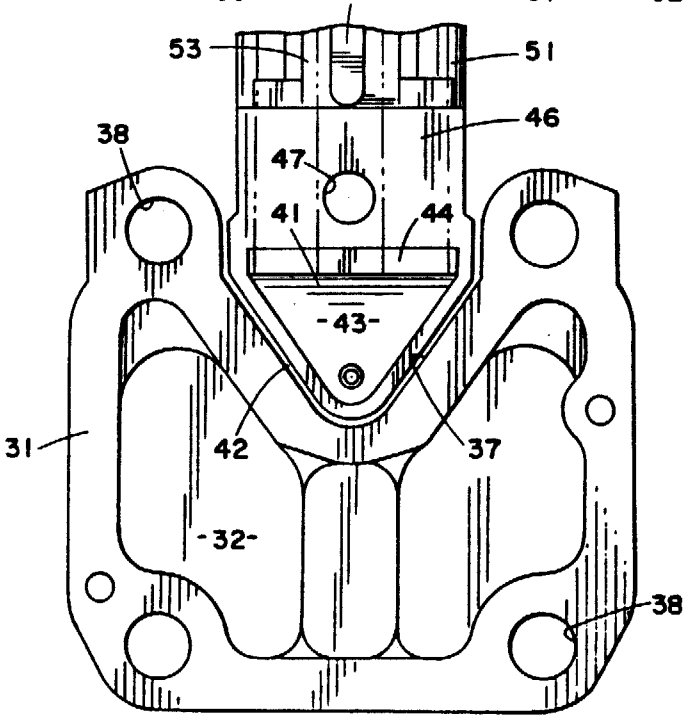
FIG. 4 is an elevational view of the valve plate side of the two cylinder heads taken on line 4—4 of FIG. 3.

The discharge cylinder head 31 defining the discharge plenum 32 is mounted on the valve plate 23 on top of the gasket 29 and serves to accumulate the discharged gases from the discharge port 27 so that they can pass through internal passages (not shown) to the discharge muffler 33 and through the discharge line 34 to the exterior of the compressor shell 10. The discharge cylinder head 31 is preferably formed of a relatively high strength material, such as cast iron, and extends over a major portion of the area of the valve plate 23. Thus, the discharge cylinder head 31 extends to the four corners of the valve plate 23 and is held in place by four bolts 36 which extend through bolt holes 38 located at the four corners of the discharge cylinder head 31 and extend through suitable openings in the gaskets, valve plate 23 and valve sheet 22 to make threaded engagement with the cylinder block 13. As shown in FIG. 4, by utilizing the discharge cylinder head 31 of this shape, the volume of the discharge plenum 32 can be made as large as possible to ensure a minimum of back pressure across the discharge valve 28 for maximum volumetric efficiency of the compressor. However, the discharge cylinder head 31 is provided with a V-shaped recess or notch having sides indicated at 37 to allow the mounting of the suction cylinder head 41.

The suction cylinder head 41 is formed as a piece separate from the discharge cylinder head 31 and is shaped to occupy that portion of the valve plate that is not covered by the discharge cylinder head. The suction cylinder head 41 is preferably formed of a non-metallic thermal insulating material to minimize the heating effect on the suction gases not only from the discharge cylinder head 31 but also from the surrounding gases within the compressor shell 10. Preferably, the suction cylinder head 41 can be made integral with at least a portion of the suction muffler so that a single piece of material can perform the structure and function of several parts as shown in the aforesaid U.S. Pat. No. 4,401,418. The suction cylinder head 41 is therefore preferably formed from a plastic material having a low thermal conductivity, yet sufficient strength and heat resistance at the elevated ambiant temperatures within the compressor shell. A suitable material for this purpose is a thermoplastic glass fiber-filled polyester such as PBT, which has the desired properties and can be easily molded into the desired configuration.

Figure 3:
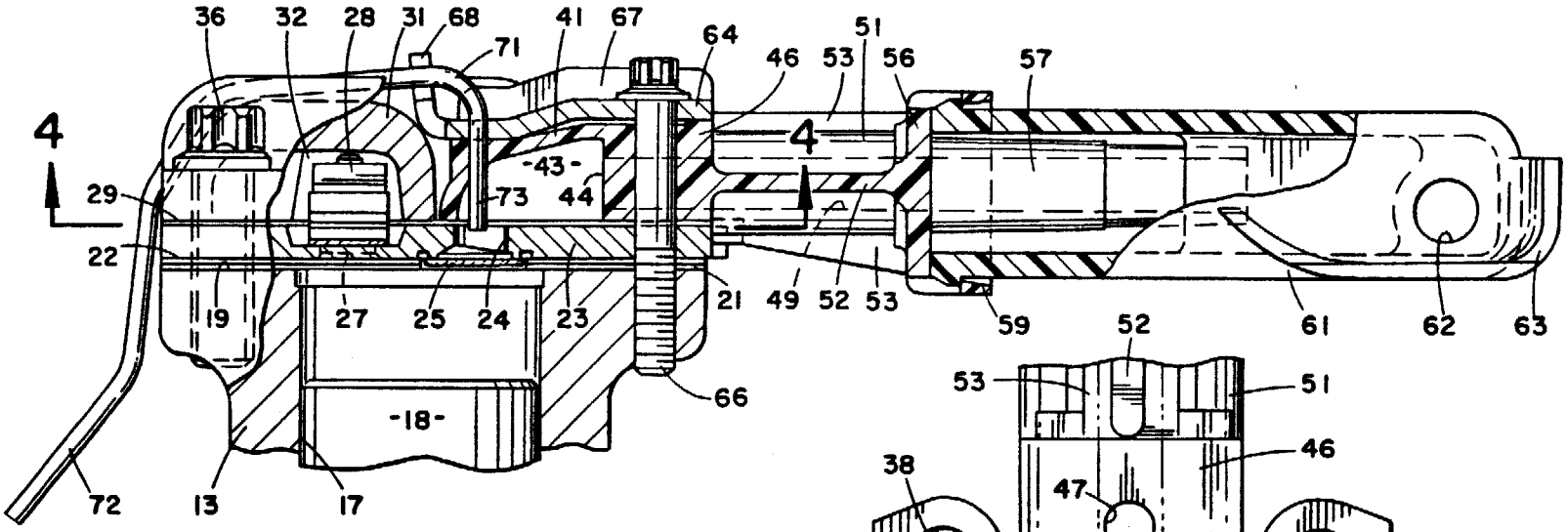
FIG. 3 is a cross-sectional view of the suction muffler and cylinder head assembly of FIG. 2.

The suction cylinder head 41 has V-shaped sides 42 designed to fit closely adjacent but spaced from the notched sides 37 on the discharge cylinder head. The cylinder head defines a suction plenum 43 of similar shape which extends over and is in full communication with the suction port 24. On the side opposite the suction port 24, the sides 42 extend into an enlarged body portion 46 having an end wall 44 closing off the outer side of the suction plenum 43. The body portion 46 has at its center a bolt hole or bore 47 extending therethrough for mounting the suction cylinder head in place. On either sides of the bolt hole 47 a pair of axial passages 49 are formed in the body portion 46 and extend outward parallel with the upper surface of the valve plate 23 through tubular extensions 51 to terminate a spaced distance away in an integral muffler base 56. The tubular extensions 51 are stiffened by an interconnecting web 52 and external ribs 53 so that the integral suction cylinder head 41 and muffler base 56 form a unitary piece of high rigidity so that the use of a single bolt through the bolt hole 47 can hold the entire assembly, including the rest of the suction muffler in place on the cylinder block 13. As shown in FIG. 3, the axial passages 49 extend beyond the muffler base 56 in the form of the pair of tubular projections 57. The muffler base 56 includes an upstanding skirt 59 to receive a muffler upper housing 61. As shown in FIG. 1, the muffler upper housing 61 extends upward toward the top of the shell or casing 10 where it has an opening 62 and projecting deflector 63 adapted to receive the incoming gas from inlet tube 60 extending inwardly through the shell 10. It will be understood that the muffler upper housing 61 is preferably formed in the same manner as the corresponding part as shown in U.S. Pat. No. 4,401,418 and the housing 61, together with the muffler base 56, and the other component parts provide a suction muffler functioning in the same manner as the muffler disclosed in that patent.

In order to mount the suction cylinder head 41 in place on the cylinder block 13, a bolt 66 extends through a metal bracket 64 on the outer surface of a suction cylinder head 41 to clamp the entire suction cylinder head and muffler assembly in place without other fasteners. The bracket 64 is formed from a relatively rigid metal such as sheet steel and includes formed ribs 67 along the sides to increase the rigidity and these ribs terminate in an outwardly projecting ear 68. Th ear 68 is used to clamp an oil tube 71 having a free end 72 which is adapted to extend down toward the shell 10 to a point below the level of the lubricating oil reservoir at the bottom of the shell. The other end 73 of the oil tube 71 extends through the bracket 64 and the suction cylinder head 41 to a point within the suction plenum 43 adjacent the suction port 24. The oil tube 71 includes a small diameter or capillary passage adapted to meter oil into the suction port to provide the necessary lubrication for the piston and cylinder as well as the suction and discharge valves. Thus, the bracket 64 not only serves as a mount for the oil tube 71, but also spreads the clamping force of the bolt 66 over a relatively large surface of the suction cylinder head 41 to avoid excessive localized compressive loads.

Thus, with the above-described construction, the portions of the compressor confining the low-pressure, cool suction gases are completely out of contact with those portions containing the high-pressure, high-temperature discharge gases at all points beyond the common valve plate to minimize any heating of the suction gases by the discharge gases which would inherently increase the temperature of the suction gases and thereby lower the volumetric efficiency of the compressor. With this construction, the discharge cylinder head can be formed of the necessary metallic material having the necessary strength to contain the high-pressure discharge gases, but the high-thermal conductivity of metallic material does not, with this construction, allow any of the heat to be conducted directly to the suction gases. On the other hand, by utilizing the suction plenum in a separate member, this member may be made of at a lower strength plastic material, since the pressures are relatively low within the suction plenum, and such material can be chosen for a very low thermal conductivity to prevent heating of the suction gases. Furthermore, the use of such a material allows the suction cylinder head and passages to be made integral with at least a portion of the suction muffler to minimize a number of component parts and reduce the number of steps required for assembly of the compressor.

Although the preferred embodiment of this invention has been shown and described, it should be understood that various modifications and rearrangements of parts may be resorted to without departing from the scope of the invention as defined in the claims.

What is claimed is:

1. A hermetic refrigerator compressor comprising a case, a motor compressor unit mounted inside said case and including a cylinder block having a cylinder with an open end and a piston therein, an electric motor secured to said cylinder block to drivingly reciprocate said piston in said cylinder, a valve plate secured to said cylinder block and closing said open cylinder end, suction and discharge valve means operatively associated with said valve plate, a first cylinder head secured to said valve plate and having a discharge plenum connected to said discharge valve, a second cylinder head secured to said valve plate and having a suction plenum connected to said suction valve, said first and second cylinder heads being substantially coextensive with said valve plate and being spaced apart at all points to minimize thermal conduction between said plenums, said second cylinder head being of a material having a lower thermal conductivity than that of the material of said first cylinder head, said second cylinder head including a pair of passages extending away from said suction plenum and being secured to said valve plate by a single bolt extending between said passages.

2. A hermetic refrigeration compressor as set forth in claim 1 wherein a metal bracket is clamped against said second cylinder head by said bolt to distribute the clamping force of said bolt over a larger area of said second cylinder head.

3. A hermetic refrigeration compressor as set forth in claim 2 including an oil tube secured to said bracket and extending into said suction plenum.

4. A hermetic refrigeration compressor comprising a case, a motor compressor unit mounted inside said case and including a cylinder block having a cylinder with an open end and a piston therein, an electric motor secured to said cylinder block to drivingly reciprocate said piston in said cylinder, a valve plate secured to said cylinder block and closing said open cylinder end, a suction port in said valve plate, [and] a unitary cylinder head and suction muffler member secured to said cylinder block, said unitary member at one end including a suction plenum adjacent said suction port, said unitary member at the other end including a suction muffler portion, said unitary member including at least one passage interconnecting said muffler portion and said suction plenum, *a discharge port in said valve plate, a discharge cylinder head secured to said valve plate and having a discharge plenum adjacent said discharge port, said unitary member and said discharge cylinder head being separate from each other to minimize thermal conduction between said plenums.*

5. A hermetic refrigeration compressor as set forth in claim 4 wherein said suction muffler portion is a muffler base constructed to support the remainder of the suction muffler structure.

6. A hermetic refrigeration compressor as set forth in claim 4 wherein said unitary member includes a pair of parallel passages extending between said muffler portion and said suction plenum.

7. A hermetic refrigeration compressor as set forth in claim 6 wherein said unitary member has a single bolt hole between said passages and a bolt extending through said bolt hole securing said unitary member to said valve plate and said cylinder block.

8. A hermetic refrigeration compressor as set forth in claim 7 wherein said unitary member is formed of a plastic material having a low thermal conductivity.

[9. A hermetic refrigeration compressor as set forth in claim 4 including a discharge port on said valve plate and a separate discharge cylinder head having a plenum connected to said discharge port.]

10. A hermetic refrigeration compressor as set forth in claim [9] *4* wherein said unitary member and said discharge cylinder head [covers] *cover* substantially the entire area of said valve plate.

11. A hermetic refrigeration compressor as set forth in claim 10 wherein said discharge cylinder head is spaced from said unitary member at all points to minimize thermal conduction.

*12. A hermetic refrigeration compressor as set forth in claim 4, wherein said unitary member is formed of a material having a lower thermal conductivity than that of the material of said discharge cylinder head.*

*13. A hermetic refrigeration compressor as set forth in claim 12 wherein said unitary member is formed of a plastic material having a low thermal conductivity.*

*14. A hermetic refrigeration compressor as set forth in claim 13 wherein said discharge cylinder head is spaced from said unitary member at all points to minimize thermal conduction between said plenums.*

*15. A hermetic refrigeration compressor as set forth in claim 13, including an oil tube connected to said unitary member for delivering oil to said suction port.*

*16. A hermetic refrigeration compressor as set forth in claim 12, including an oil tube connected to said unitary member for delivering oil to said suction port.*

* * * * *